(12) United States Patent
Arlt et al.

(10) Patent No.: US 9,227,652 B2
(45) Date of Patent: Jan. 5, 2016

(54) RACK AND PINION WEAR COMPENSATION

(71) Applicant: Steering Solutions IP Holding Corporation, Saginaw, MI (US)

(72) Inventors: George E. Arlt, Midland, MI (US); Cory R. Ricker, Hemlock, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/202,829

(22) Filed: Mar. 10, 2014

(65) Prior Publication Data

US 2014/0260742 A1 Sep. 18, 2014

Related U.S. Application Data

(60) Provisional application No. 61/777,611, filed on Mar. 12, 2013.

(51) Int. Cl.
*B62D 3/12* (2006.01)
*F16H 55/28* (2006.01)

(52) U.S. Cl.
CPC ........ *B62D 3/123* (2013.01); *B62D 3/12* (2013.01); *F16H 55/283* (2013.01); *Y10T 74/19628* (2015.01)

(58) Field of Classification Search
CPC ........ B62D 3/123; B62D 3/12; F16H 55/283; Y10T 74/19628
USPC ........ 74/388 PS, 406, 422; 180/428
See application file for complete search history.

(56) References Cited

U.S. PATENT DOCUMENTS

| | | | |
|---|---|---|---|
| 4,640,148 A * | 2/1987 | Hasegawa | 74/422 |
| 5,265,691 A * | 11/1993 | Konishi et al. | 180/400 |
| 6,619,420 B1 * | 9/2003 | Saarinen | 180/428 |
| 7,197,956 B2 * | 4/2007 | Bieber et al. | 74/422 |
| 7,281,444 B1 * | 10/2007 | Bishop | 74/388 PS |
| 7,305,901 B2 * | 12/2007 | Joachim et al. | 74/422 |
| 8,336,413 B2 * | 12/2012 | Dodak et al. | 74/388 PS |
| 2008/0034910 A1 * | 2/2008 | Roline et al. | 74/422 |
| 2012/0227526 A1 * | 9/2012 | Lescorail et al. | 74/406 |

FOREIGN PATENT DOCUMENTS

| | | |
|---|---|---|
| DE | 3637107 A | 5/1988 |
| DE | 199737254 A | 2/2001 |
| WO | 2007100815 A2 | 9/2007 |

OTHER PUBLICATIONS

European Search Report for EP App. No. 14158864.0, mailed from the European Patent Office on Jul. 3, 2014, 7 pages.

* cited by examiner

*Primary Examiner* — Ruth Ilan
*Assistant Examiner* — Timothy Wilhelm
(74) *Attorney, Agent, or Firm* — Cantor Colburn LLP

(57) ABSTRACT

An automotive steering system includes a steering assembly including a rack and a pinion, and a rack bearing configured to contact the rack, the rack bearing disposed in a rack bearing bore of a housing. The system also includes a wear compensation assembly in fluid communication with a rack bearing bore cavity disposed within the rack bearing, the wear compensation assembly configured to draw fluid into the rack bearing bore cavity in response to movement of the rack bearing within the rack bearing bore.

20 Claims, 2 Drawing Sheets

RACK AND PINION WEAR COMPENSATION

CROSS-REFERENCES TO RELATED APPLICATIONS

This patent application claims priority to U.S. Provisional Patent Application Ser. No. 61/777,611, filed Mar. 12, 2013, which is incorporated herein by reference in its entirety.

BACKGROUND OF THE INVENTION

Typical rack and pinion automotive steering assemblies include a pinion shaft and rack, incorporated with a design that includes a conventional rack bearing, coil spring and adjuster plug design. During use, various components of the steering assembly wear. Such components may include rack bearing liners and rack and pinion teeth. Such wear creates clearance gaps between components that can result in unwanted noise and vibration.

SUMMARY OF THE INVENTION

An embodiment of an automotive steering system includes a steering assembly including a rack and a pinion, and a rack bearing configured to contact the rack, the rack bearing disposed in a rack bearing bore of a housing. The system also includes a wear compensation assembly in fluid communication with a rack bearing bore cavity disposed within the rack bearing, the wear compensation assembly configured to draw fluid into the rack bearing bore cavity in response to movement of the rack bearing within the rack bearing bore.

An embodiment of a wear compensation assembly includes a fluid source in fluid communication with a rack bearing bore of a housing, the rack bearing bore configured to have a rack bearing disposed therein, the rack bearing configured to contact a rack of a rack and pinion steering assembly. The assembly also includes a fluid control device configured to advance fluid from the fluid source into the rack bearing bore in response to a channel forming between the rack bearing and an adjuster plug seated with the rack bearing bore and configured to retain the rack bearing bore with the rack bearing bore.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Systems, apparatuses and methods for compensating for wear in a steering assembly are provided in exemplary embodiments of the invention. An embodiment of a wear compensation assembly includes a fluid source configured to insert fluid (e.g., hydraulic steering fluid) into channels, gaps or clearance spaces that form due to wear of steering assembly components. In one embodiment, the wear compensation assembly includes a fluid reservoir in fluid communication with a rack bearing bore in a housing. Fluid may be drawn into the bore and into channels, gaps or clearance spaces (e.g., between a rack bearing and an adjuster plug) due to negative pressure in the channels. As used herein, the term negative pressure refers to a pressure differential between adjacent areas, such that negative pressure represents the areas where pressure is lower than an adjacent area. In the exemplary embodiment shown, negative pressure is a pressure lower than atmospheric pressure.

The wear compensation assembly provides a mechanism for reducing or damping movement caused by clearances formed due to steering assembly component wear, such as wearing of rack bearing liners and rack and pinion teeth. Such clearances may cause an increase in component accelerations when vehicle load impacts through the rack and pinion. This can result in objectionable noise. Application of the fluid by the wear compensation assembly into channels or clearance spaces (e.g., spaces between the rack bearing and the adjuster plug) dampens accelerations and objectionable noise by conforming to areas of potential clearance between, e.g., the rack bearing and adjuster plug.

Figure 1:
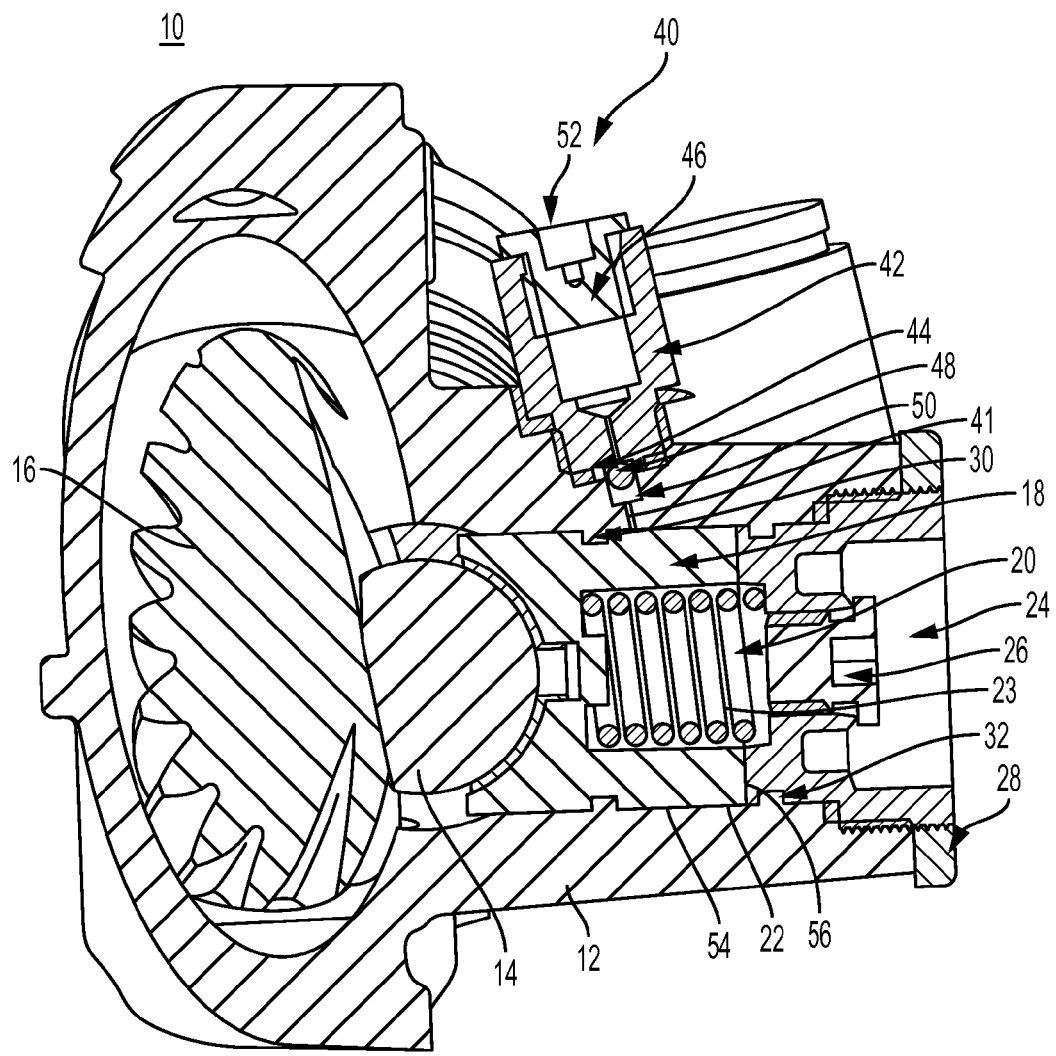
FIG. 1 depicts an exemplary embodiment of a rack and pinion steering assembly.

Referring to FIG. 1, an exemplary automotive steering assembly 10 includes a housing 12 that interacts with a rack assembly 14 and a pinion shaft 16. The housing 12 includes a rack bearing 18 (e.g., an aluminum rack bearing) that contacts the rack 14. The rack bearing 18 may include a rack bearing liner to reduce frictional resistance to relative sliding between the rack 14 and the rack bearing 18. A coil spring 20 or other biasing component biases the rack bearing 18 to maintain the rack bearing 18 in contact with the rack 14. In one embodiment, the rack bearing 18 is disposed in a rack bearing bore 22 formed in the housing 12.

In one embodiment, the coil spring 20 is held in place at least partially within the rack bearing bore cavity 23 by an adjuster plug 24 which may include an additional plug 26. The adjuster plug 24 and/or plug 26 is secured by a lock nut 28. A first o-ring seal 30 is provided between the housing 12 and the rack bearing 18, and second o-ring seal 32 is provided between the adjuster plug 24 and the housing 12. In the embodiment shown, the o-rings 30 and 32 are resilient members capable of elastic deformation.

The assembly 10 includes or is in operable communication with a hydraulic wear compensation assembly 40. The wear compensation assembly 40 includes a fluid source configured to damp or otherwise reduced movement and noise resulting from wear of various components of the steering assembly. The fluid may be any suitable fluid that can provide a resistant and/or damping effect. Exemplary fluids include hydraulic fluids such as hydraulic power steering fluid. In exemplary embodiments, the fluid source is a fluid reservoir 42 mounted in fluid communication with the rack bearing bore 22 via a fluid source channel 41. The fluid reservoir 42 may be mounted with or in the housing 12, but is not so limited. The primary fluid reservoir 42 may include various seals to retain the fluid therein, such as a reservoir seal 44 and a plug 46.

The wear compensation assembly 40 is configured to apply fluid from fluid reservoir 42 and out fluid source channel 41 to the rack bearing bore cavity 23 via a first channel portion or extrusion gap 54 formed between rack bearing bore 22 and rack bearing 18 and a second channel portion 56 formed between rack bearing 18 and the adjuster plug 24. Second channel portion 56 is formed by wear of the rack bearing 18 within rack bearing bore 22. Specifically, second channel portion 56 is formed due to wear of the rack bearing 18 as it moves within rack bearing bore 22 during the service life of steering assembly 10. As can be seen, once there has been wear between rack bearing 18 and adjuster plug 24, the first channel portion 54 and/or the second channel portion 56 open up to, and are in fluid communication with rack bearing bore cavity 23.

Figure 2:
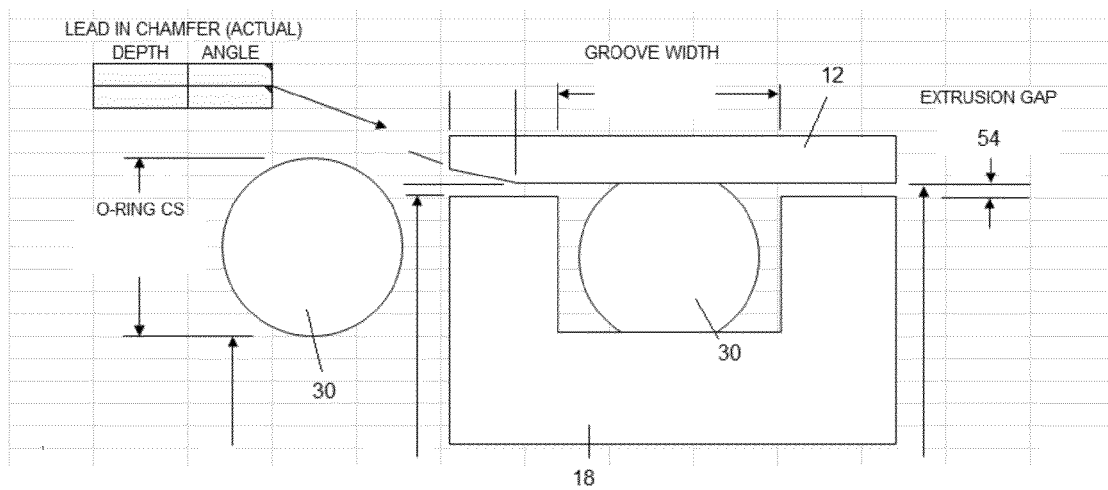
FIG. 2 depicts a cross-section of a sealing component of the steering assembly of FIG. 1.

It will be appreciated that at least second channel portion 56 is not necessarily a distinct or defined flow path, but instead may include any gap or clearance areas in which spaces form between rack bearing 18 and adjuster plug 24. Generally, first channel portion 54 is formed between rack bearing 18 and rack bearing bore 22 during assembly and by the relative dimensions of o-ring seals 30 and 32, as best seen in FIG. 2. However, it will be appreciated that the dimensions and size of first channel portion 54 may change over the service life of assembly 10 as parts wear. As shown, first channel portion 54 is bounded at opposite ends by first o-ring seal 30 and second o-ring seal 32. As such, it will be appreciated that first channel portion 54 may also include an extrusion gap portion formed between adjuster plug 24 and housing 12, extending between second channel portion 56 and second o-ring seal 32.

The fluid reservoir 42 is configured to allow fluid to travel into the rack bearing bore 22. For example, negative pressures occurring in the bore 22 due to first channel portion 54 causes fluid to be drawn into the at least first channel portion 54 and bore 22 from the fluid reservoir 42. As second channel portion 56 forms and negative pressures continue to draw fluid flow from fluid reservoir 42, the second channel portion 56 and/or the rack bearing bore cavity 23 fills with fluid. Fluid within channel portions 54, 56 and/or rack bearing bore cavity 23 together form a fluid dampener to relieve sudden impacts and accelerations within the bore 22.

In one embodiment, the assembly 40 includes a fluid control device such as a check valve 48 or other valve system configured to allow fluid to be advanced into the channel portions 54, 56 and rack bearing cavity 23. For example, a check valve ball seal of check valve 48 and check valve coil spring 50 allow fluid to travel into the bore 22 during wear conditions that cause channel portions to form, but not otherwise escape or flow back into fluid reservoir 42, e.g., during gear loading events. After fluid is inserted into channel portions 54, 56 in the bore 22, the fluid is held within the clearance spaces by sealing components such as the o-rings 30, 32 and the check valve 48.

In use, for example, when wear occurs within the system 10, the rack bearing coil spring 20 forces the rack bearing 18 toward the rack 14 and pinion 16, which creates clearance between the rack bearing 18 and the adjuster plug 24, creating a negative pressure within the bore 22 and specifically in channel portions 54 and 56. A negative pressure, i.e. a pressure differential between fluid reservoir 42 and rack bearing bore 22, causes the check valve 48 to open, allowing stored fluid from the fluid reservoir 42 to enter the rack bearing bore cavity 23 and maintain acceleration and noise dampening performance for the assembly 10. For example, as shown in FIG. 2, the fluid enters the bore 22 through first channel portion or extrusion gap 54 formed between the rack bearing 18 and rack bearing bore 22 within the housing 12. In one embodiment, the plug 46 includes a breather patch 52 that allows the fluid reservoir 42 to maintain atmospheric pressure therein. As such, negative pressure in the embodiment shown will be less than atmospheric pressure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An automotive steering system, comprising:
a steering assembly including a rack and a pinion;
a rack bearing configured to contact the rack, the rack bearing disposed in a rack bearing bore of a housing; and
a wear compensation assembly in fluid communication with a rack bearing bore cavity disposed within the rack bearing, the wear compensation assembly configured to draw fluid from a fluid reservoir through a channel portion into the rack bearing bore cavity based on a negative pressure occurring in the rack bearing bore cavity in response to at least one of the channel portion forming due to wear occurring within the system and the channel portion increasing in size due to the wear, the wear occurring in response to movement of the rack bearing within the rack bearing bore, the wear compensation assembly including a component that maintains the fluid reservoir at a pressure that is greater than the negative pressure.

2. The system of claim 1, wherein the wear compensation assembly includes a fluid source channel formed in the housing, the fluid source channel configured to advance the fluid first into the into the channel portion, and subsequently from the channel portion to the rack bearing bore cavity.

3. The system of claim 2, wherein the fluid reservoir is disposed in the housing and is in fluid communication with the rack bearing bore cavity via the fluid source channel formed in the housing.

4. The system of claim 3, wherein the fluid reservoir includes a valve assembly configured to allow fluid to travel into the rack bearing bore in response to the second channel forming.

5. The system of claim 3, wherein the wear compensation assembly includes a check valve configured to prevent fluid flow from the rack bearing bore into the fluid reservoir.

6. The system of claim 1, wherein the component includes a breather patch configured to maintain the reservoir at an atmospheric pressure that is greater than the negative pressure forming.

7. The system of claim 1, wherein the channel portion includes a first channel portion forming between the rack bearing and the housing, and a second channel portion forming between the rack bearing and an adjuster plug.

8. The system of claim 7, wherein the wear compensation assembly includes a fluid source channel formed in the housing, the fluid source channel terminating at the first channel portion.

9. The system of claim 1, wherein the channel portion is formed between the rack bearing and the rack bearing bore.

10. The system of claim 9, wherein the channel portion includes opposite ends and at least one sealing component is disposed at each of the opposite ends and configured to hold the fluid within the channel portion.

11. The system of claim 10, wherein the at least one sealing component includes two o-rings, a first o-ring disposed between the rack bearing bore and the rack bearing, and a second o-ring disposed between the housing and an adjuster plug configured to retain the rack bearing within the rack bearing bore.

12. A wear compensation assembly comprising:
a fluid reservoir in fluid communication with a rack bearing bore of a housing, the rack bearing bore configured to have a rack bearing disposed therein, the rack bearing forming a rack bearing bore cavity therein, the rack bearing configured to contact a rack of a rack and pinion steering assembly; and
a fluid control device configured to advance fluid from the fluid reservoir into the rack bearing bore cavity based on a negative pressure occurring in the rack bearing bore cavity in response to a channel forming between the rack bearing and an adjuster plug seated with the rack bearing bore and configured to retain the rack bearing within the rack bearing bore, the channel forming due to wear of the rack bearing, the fluid control device configured to advance the fluid into the rack bearing bore cavity through the channel, the fluid control device including a component that maintains the fluid reservoir at a pressure that is greater than the negative pressure.

13. The assembly of claim 12, wherein the fluid reservoir is disposed in the housing and is in fluid communication with the fluid control device.

14. The assembly of claim 12, wherein the component includes a breather patch configured to maintain the reservoir at an atmospheric pressure that is greater than the negative pressure.

15. The assembly of claim 12, wherein the channel extends between the rack bearing and the adjuster plug.

16. The assembly of claim 12, wherein the fluid control device includes a valve assembly configured to open and close in response to a pressure differential between the fluid reservoir and the channel.

17. The assembly of claim 16, wherein the valve assembly includes a check valve.

18. The assembly of claim 12, further comprising an extrusion gap formed between the rack bearing and the rack bearing bore, the extrusion gap in fluid communication between the fluid reservoir and the channel.

19. The assembly of claim 18, further comprising at least one resilient sealing component configured to retain the fluid within the extrusion gap.

20. The assembly of claim 19, wherein the at least one resilient sealing component includes two o-rings, a first o-ring disposed between the rack bearing bore and the rack bearing, and a second o-ring disposed between the housing and the adjuster plug configured to retain the rack bearing within the rack bearing bore.

* * * * *